A. SPIRIDAKIS.
SPRING WHEEL.
APPLICATION FILED JULY 2, 1918.

1,281,865. Patented Oct. 15, 1918.

Witness
Edwin J Bellew

Inventor
A. Spiridakis
by Wilkinson & Fisher
Attorneys

UNITED STATES PATENT OFFICE.

ANASTASIOS SPIRIDAKIS, OF GALVESTON, TEXAS.

SPRING-WHEEL.

1,281,865.

Specification of Letters Patent.

Patented Oct. 15, 1918.

Application filed July 2, 1918. Serial No. 243,021.

*To all whom it may concern:*

Be it known that I, ANASTASIOS SPIRIDAKIS, a citizen of the Kingdom of Greece, but who declared his intention to become a citizen of the United States, residing at Galveston, in the county of Galveston and State of Texas, have invented certain new and useful Improvements in Spring-Wheels; and I do hereby declare the following to be a full, clear, and exact description of the invention, such as will enable others skilled in the art to which it appertains to make and use the same.

The present invention relates to improvements in that class of vehicle wheels which has come to be known as spring wheels, and in which the pneumatic tire is dispensed with and a non-puncturable tire used in place thereof; the resiliency of the wheel being obtained through the use of spring devices forming a part of the wheel structure.

It is an object of my invention to improve the construction of vehicle wheels of this character more particularly in the matter of securing a high degree of resiliency combined with great strength of the wheel structure, and to build up the wheel in an economical manner consisting of few parts that are arranged to be readily assembled.

In the accompanying drawings forming a part of this application, and in which similar reference symbols indicate corresponding parts in the several views.

Figure 1:
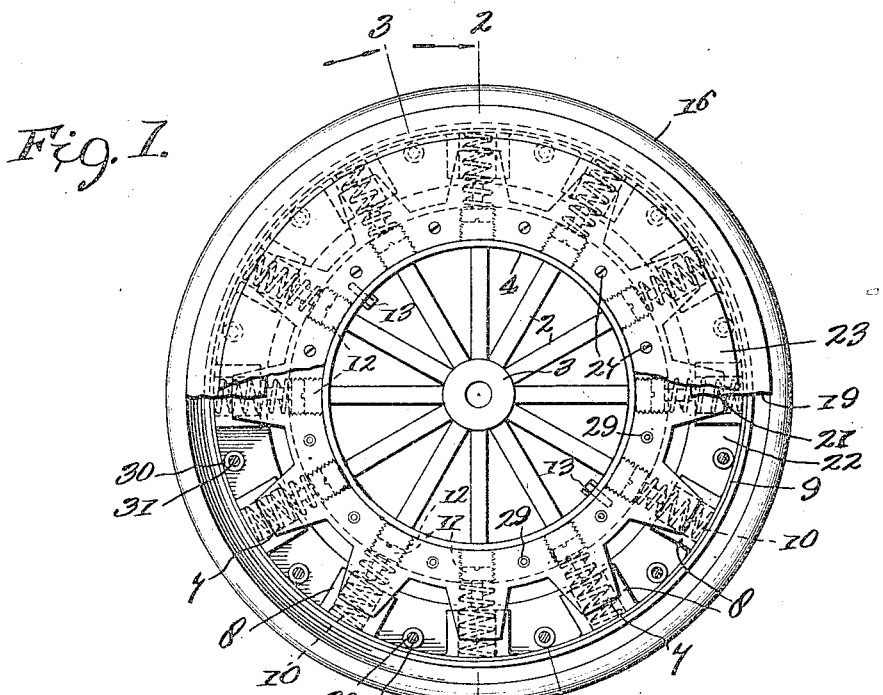
Figure 1 is a front elevational view of a vehicle wheel constructed in accordance with my present invention and showing certain parts broken away.

Referring now more particularly to the drawings, 2 designates the spokes of the wheel which are attached and radiate in the usual manner from a central hub 3 adapted to be fitted over the vehicle axle; which spokes are, in accordance with the present invention, considerably shorter in length than the spokes of present vehicle wheels and carry on their outer ends a felly band 4. This felly band 4 is attached to the spokes in any common manner, such, for instance, as being perforated to fit over the reduced ends of the spokes 2 and being shrunk thereon.

Over the felly band is placed a rim 5 having pairs of flanges 6 and 7 spaced apart circumferentially and axially of the wheel to form guides for sockets 8 projecting radially inward from a ring 9 concentric with the rim 5. The sockets 8 and areas inclosed by the several pairs of flanges 6 and 7 are arranged to receive coil springs 10 which are held in place and under suitable compression by heads 11 threaded and adjustably movable in threaded openings made radially in said rim 5. The threaded openings 12 are arranged to be brought in alinement with the spokes 2 when the rim 5 is assembled on the felly band 4 in order that the strain may be transmitted through the springs 10 directly to the spokes 2 and thence to the hub 3.

The rim 5 may be held in place on the felly band 4 in any suitable manner, as for instance by screws 13.

At 15 are shown pins which project from the threaded heads 11 up through the convolutions of the coil springs 10, in order that the latter may be held from possible displacement and be guided in their compression and expansion.

Figures 2, 3:
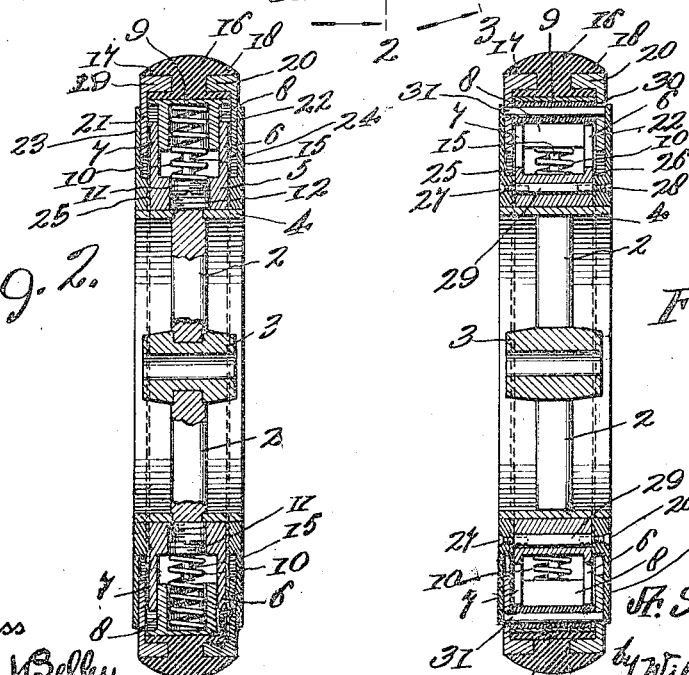
Fig. 2 is a vertical sectional view taken on the line 2—2 in Fig. 1.
Fig. 3 is a similar view taken on the line 3—3 in Fig. 1.

Over the outer ring 9 I place the tire 16, which is preferably made of iron or steel and which is suitably rounded off on its periphery or otherwise formed in accordance with the purpose of its use. If desired, the metal tire 16 may be covered with rubber or other suitable material to insure quiet running. As shown to advantage in Figs. 2 and 3, the tire 16 is formed with lateral annular grooves 17 and 18 occupied by shoulders 19 and 20 formed on the outer sides of annular plates 21 and 22, which are free to slide over the flanges 6 and 7 which project from the rim 5.

Caps 23 and 24 are put on over the felly band 4 and on the exterior of the plates 21 and 22 which act as guides for the latter, forming guideways between the same and the flanges 6 and 7. Shoulders 25 and 26 are formed at the bases of the guideways by the caps 23 and 24 in order to limit the inward movement of the plates 21 and 22. These caps 23 and 24 are adapted to be held in place by countersunk screws 27 and 28 threaded into openings in the ends of pins 29 which lie in transverse openings in the rim 5, which openings are arranged concentrically and between the threaded radial openings 12. The plates 21 and 22 are held apart by spacing sleeves 30 through which pass pins 31 having their ends engaged in openings in said plates 21 and 22 as shown clearly in Fig. 3; the ends of the pins 31 being confined by the caps 23 and 24.

The device may be assembled by fitting the ring 9 axially over the rim 5 after first bringing the sockets 8 in registry with the spaces between the pairs of flanges 6 and 7 carried by said rim. In this way the sockets 8 may readily enter between the flanges 6 and 7, and once the rim and ring are brought concentrically together either the rim or the ring may be rotated the one with respect to the other so as to bring the sockets 8 between the pairs of flanges 6 and 7. The coil springs 10 may now be introduced through the threaded openings 12, which is followed by screwing the heads 11 therethrough and compressing the springs therein to the required degree. The tire 16 may be now placed on the ring 9 and the plates 21 and 22 engaged therewith in the manner shown and above described, at the same time putting the spacing sleeves 30 and pins 31 in place. The caps 23 and 24 are thereafter fitted on the outside of the plates 21 and 22 and the screws 27 and 28 threaded in the pins 29, whereby the whole may be secured together. The parts thus assembled may be then slipped over the felly band 4, and the means employed to hold the same thereon may be then put in place. Of course the improved wheel may be assembled in any other order desired.

In use, as the vehicle travels along, the tire 16 or the rubber covering carried thereby will roll along the roadway, and the coil springs 10 will be successively compressed by the weight of the vehicle when in contact with the road and expanded after passing out of contact with the road, and the adjustability in their compression admits of securing the desired resiliency. The plates 21 and 22 will slide in the guideways between the flanges 6 and 7 and the caps 23 and 24 as this compression and expansion of the coil springs 10 takes place, and as the springs are compressed the strain devolving thereon will be transmitted to the central hub 3 through the spokes 2. The coil springs 10 may be employed in any suitable number in the wheel and may be spaced apart circumferentially to a desired distance, or assembled very closely together. The employment of the twelve coil springs in combination with the twelve spokes 2 of the wheel will be found to give good results.

It is obvious that those skilled in the art may vary the details of construction and arrangements of parts without departing from the spirit of my invention, and therefore I do not wish to be limited to such features except as may be required by the claims.

I claim:

1. In an improved wheel of the character described, the combination of a central wheel structure having a felly band, a rim carried on said felly band, flanges projecting radially outward from said rim, said flanges being arranged in pairs, the flanges constituting each pair being spaced apart transversely, each pair of flanges being spaced circumferentially from the adjoining pairs of flanges, a ring, sockets carried by said ring and projecting radially inward therefrom, said sockets adapted to be movable with said ring axially with respect to said rim when the parts are assembled and to enter through the circumferential spaces between adjacent pairs of flanges, the rim and sockets adapted to be rotated with respect to said rim to bring the sockets into the transverse spaces between the flanges of each pair, cushioning means disposed in said sockets and in the transverse spaces between the flanges, a tire, and means for holding the tire on said ring, substantially as described.

2. A wheel of the character described including a central wheel structure composed in part of a felly band, a rim mounted over said felly band, means for connecting said felly band and rim, flanges projecting radially outward from said rim, a ring extending about said rim, sockets projecting inwardly from said rim and entering spaces between said flanges, cushioning means arranged in said sockets and in the spaces between said flanges, a tire passing about said ring, plates for holding said tire in position, said plates passing on the exterior of said flanges and having a sliding movement thereover, headless pins passing through said plates, caps fitted on opposite sides of said plates and spaced from said flanges whereby to provide guideways for slidingly receiving said plates, the caps adapted to confine the pins in place, and means for holding said cap plates in position, substantially as described.

In testimony whereof, I affix my signature.

ANASTASIOS SPIRIDAKIS.